United States Patent
Tanii et al.

(10) Patent No.: US 9,934,036 B2
(45) Date of Patent: Apr. 3, 2018

(54) COMPILER METHOD, PARALLEL PROCESSING METHOD, AND COMPILER APPARATUS

(71) Applicant: FUJITSU LIMITED, Kawasaki-shi, Kanagawa (JP)

(72) Inventors: Shunsuke Tanii, Kawasaki (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 14/968,084

(22) Filed: Dec. 14, 2015

(65) Prior Publication Data

US 2016/0246579 A1    Aug. 25, 2016

(30) Foreign Application Priority Data

Feb. 25, 2015    (JP) .................. 2015-035777

(51) Int. Cl.
*G06F 9/30* (2018.01)
*G06F 9/45* (2006.01)

(52) U.S. Cl.
CPC .......... *G06F 9/30058* (2013.01); *G06F 8/453* (2013.01); *G06F 9/3001* (2013.01)

(58) Field of Classification Search
CPC . G06F 8/45; G06F 8/453; G06F 8/456; G06F 9/30058; G06F 9/3001
USPC ........................................................ 717/149
See application file for complete search history.

(56) References Cited

U.S. PATENT DOCUMENTS

| | | | | |
|---|---|---|---|---|
| 5,724,565 A | * | 3/1998 | Dubey | G06F 9/3804 712/200 |
| 2010/0281489 A1 | * | 11/2010 | Lee | G06F 9/5038 718/106 |
| 2014/0052971 A1 | * | 2/2014 | Sehr | G06F 8/52 712/227 |

FOREIGN PATENT DOCUMENTS

| | | |
|---|---|---|
| JP | 5-12033 | 1/1993 |
| JP | 5-61899 | 3/1993 |

\* cited by examiner

*Primary Examiner* — Li B. Zhen
*Assistant Examiner* — Hui-Wen Lin
(74) *Attorney, Agent, or Firm* — Fujitsu Patent Center

(57) ABSTRACT

A compiler method that performs parallel processing on a data set using multithreading. The method includes calculating a divisor for dividing the data set. The data set is divided into a number of subsets greater than a number of threads. The method generates a plurality of data subsets and executable code. The code performs processing operations and an instruction executed by a first thread that reaches the code. After completing processing operations related to the subsets that have been assigned to the threads, the next subsets are assigned to the threads. When assigning the next subsets, synchronous processing is performed in order to determine which one of "unprocessed", "processed", and "assigned to a different thread" is the state of each of the subsets.

11 Claims, 17 Drawing Sheets

COMPILER METHOD, PARALLEL PROCESSING METHOD, AND COMPILER APPARATUS

CROSS-REFERENCE TO RELATED APPLICATION

This application is based upon and claims the benefit of priority of the prior Japanese Patent Application No. 2015-035777, filed on Feb. 25, 2015, the entire contents of which are incorporated herein by reference.

FIELD

The embodiments discussed herein are related to a compiler method, a parallel processing method, and a compiler apparatus.

BACKGROUND

Object code that causes a multiprocessor computer to perform parallel processing is generated from source code by a compiler program.

The related technique is disclosed in Japanese Laid-open Patent Publication No. 5-12033 or Japanese Laid-open Patent Publication No. 5-61899.

SUMMARY

According to an aspect of the embodiments, a compiler method includes: calculating, by a computer, based on a number of elements of a set of data and a number of threads, a divisor for dividing the set of data, the divisor being greater than the number of threads; generating a plurality of data subsets by dividing the set of data by the divisor; and generating, for each of the plurality of data subsets, object code that includes executable code that performs processing of the respective data subsets and an instruction that is arranged at a start of the executable code and is to be executed by a first thread that reaches first the executable code.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

When performing parallel processing on a large amount of data using multithreading, the data to be processed is divided into subsets, the number of subsets being greater than the number of threads, and the data in each of the subsets to be processed is placed in a memory. Once the threads have completed processing operations related to the subsets that have been assigned to the threads, the next subsets are assigned to the threads. In such processing, when assigning the next subsets, synchronous processing is performed in order to determine which one of "unprocessed", "processed", and "assigned to a different thread" is the state of each of the subsets. The synchronous processing part of the entire processing may be overhead. If the number of times the synchronous processing is performed increases, the overall processing time may not be reduced due to the overhead caused by the synchronous processing even if the data processing time is reduced.

Figure 1:
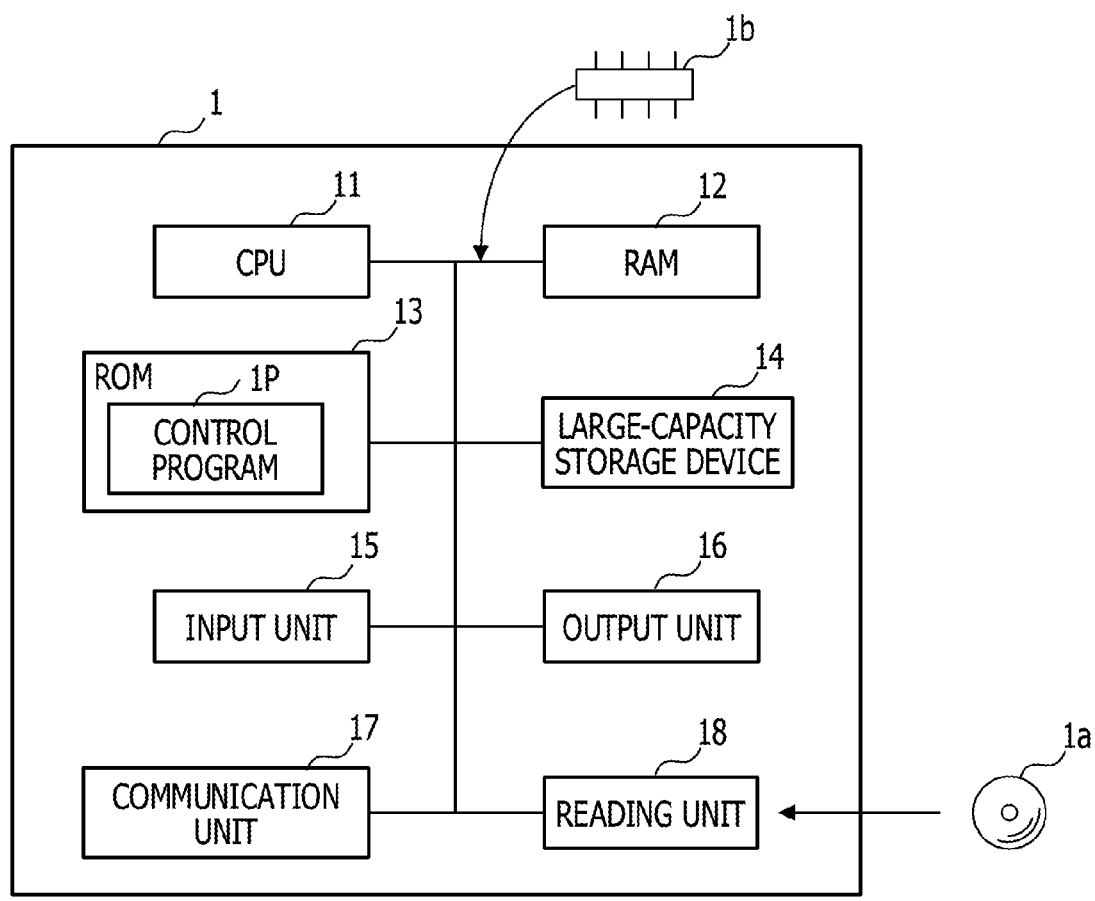
FIG. 1 illustrates an example of a hardware configuration of a compiler apparatus.

FIG. 1 illustrates an example of a hardware configuration of a compiler apparatus. A compiler apparatus 1 may be a general purpose computer, a workstation, a desktop personal computer (PC), a laptop personal computer (PC), or the like. The compiler apparatus 1 includes a central processing unit (CPU) 11, a random access memory (RAM) 12, a read only memory (ROM) 13, a large-capacity storage device 14, an input unit 15, an output unit 16, a communicating unit 17, and a reading unit 18. These components are coupled to one another via a bus.

The CPU 11 controls each hardware unit in accordance with a control program 1P that is stored in the ROM 13. The RAM 12 may be, for example, a static RAM (SRAM), a dynamic RAM (DRAM), or a flash memory. Data that is generated when the CPU 11 runs a program is temporarily stored in the RAM 12.

The large-capacity storage device 14 may be, for example, a hard disk, a solid state drive (SSD) or the like. Various data is stored in the large-capacity storage device 14. The control program 1P may be stored in the large-capacity storage device 14.

Examples of the input unit 15 include a keyboard, a mouse, and the like that are to be used for inputting data to the compiler apparatus 1.

Examples of the output unit 16 include a display device that performs image output, a speaker that performs audio output, and the like.

The communicating unit 17 communicates with another computer via a network. The reading unit 18 reads data or a program and the like from a portable storage medium 1a. Examples of the portable storage medium is include a compact disc (CD)-ROM and a digital versatile disc (DVD)-ROM. For example, the CPU 11 may read the control program 1P from the portable storage medium is via the reading unit 18, and then the control program 1P may be stored in the large-capacity storage device 14. Alternatively, the CPU 11 may download the control program 1P from another computer via a network, and then the control program 1P may be stored in the large-capacity storage device 14. Alternatively, the CPU 11 may read the control program 1P from a semiconductor memory 1b.

Figure 2:
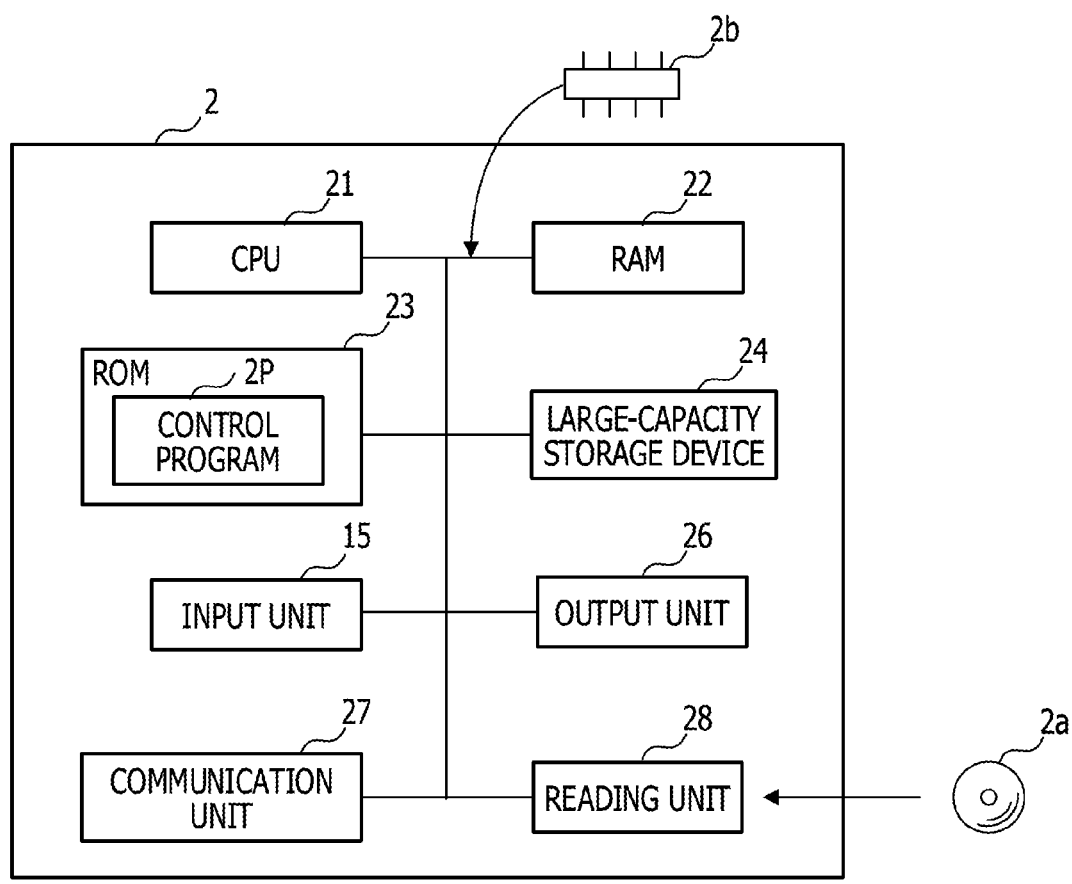
FIG. 2 illustrates an example of a hardware configuration of a parallel processing apparatus.

FIG. 2 illustrates an example of a hardware configuration of a parallel processing apparatus. A parallel processing apparatus 2 may be a general purpose computer, a workstation, a desktop PC, a laptop PC, or the like. The parallel processing apparatus 2 includes a CPU 21, a RAM 22, a ROM 23, a large-capacity storage device 24, an input unit 25, an output unit 26, a communicating unit 27, and a reading unit 28. These components are coupled to one another via a bus. The hardware configuration of the parallel processing apparatus 2 illustrated in FIG. 2 may be similar to that of the compiler apparatus 1 illustrated in FIG. 1, and description thereof may be omitted or reduced.

The compiler apparatus 1 runs a compiler program and generates a parallel processing program (object code), which is runnable by the parallel processing apparatus 2, from source code. Alternatively, the parallel processing program may be generated as a result of the parallel processing apparatus 2 running the compiler program.

Figure 3:
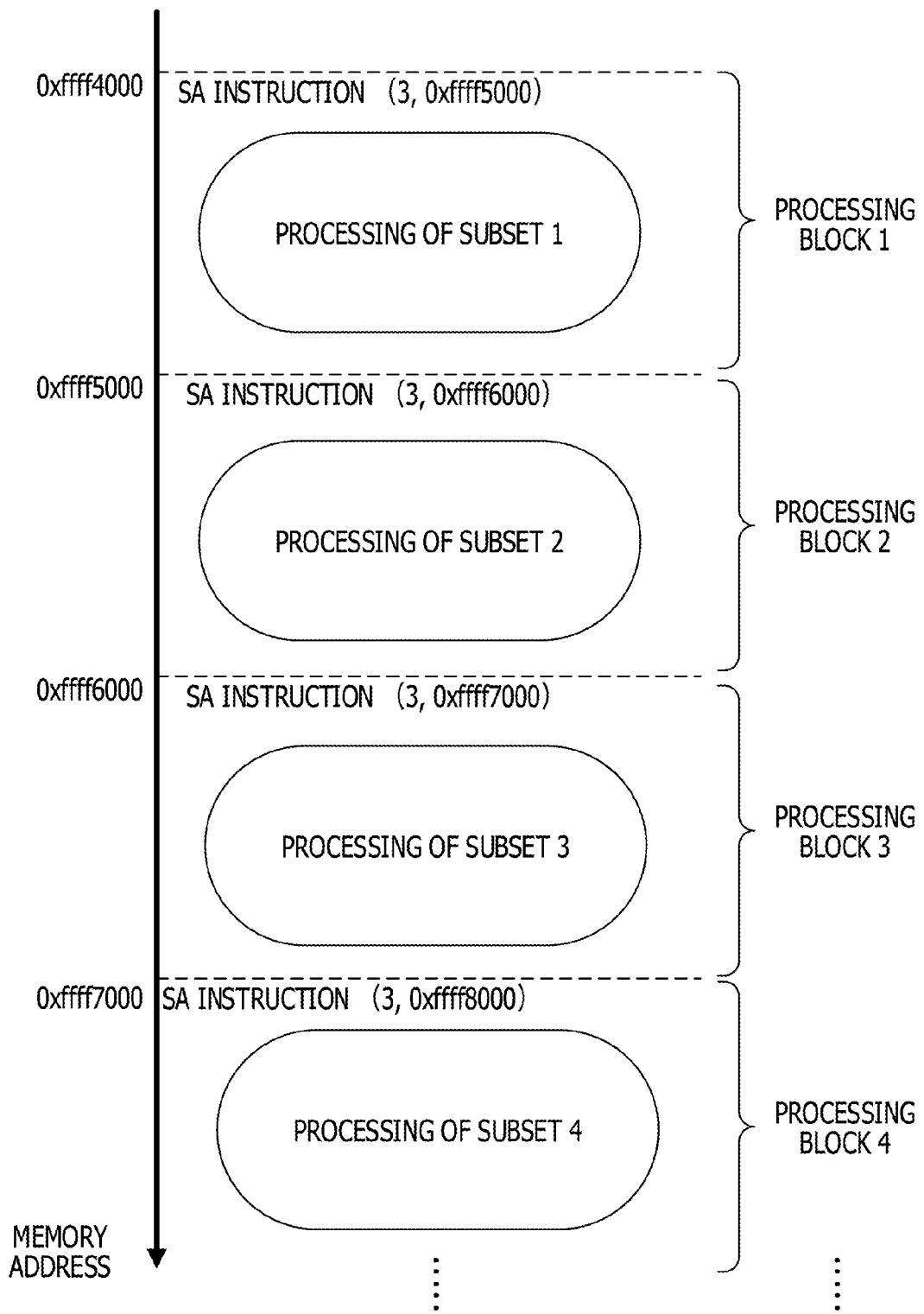
FIG. 3 illustrates an example of a structure of a parallel processing program.

The parallel processing program divides a set of data to be processed into a certain number of subsets, and a processing block is provided for each of the divided subsets. FIG. 3 illustrates an example of a structure of a parallel processing program. The parallel processing program divides data to be processed into subsets and includes processing blocks (blocks of executable code) each of which is provided for processing one of the divided subsets. FIG. 3 illustrates a processing block 1 in which processing is performed on a subset 1, a processing block 2 in which processing is performed on a subset 2, a processing block 3 in which processing is performed on a subset 3, and a processing block 4 that performs processing in which processing is performed on a subset 4. A conditional branching instruction (hereinafter referred to as "SA instruction") is embedded at a head of each of the processing blocks.

Figure 4:
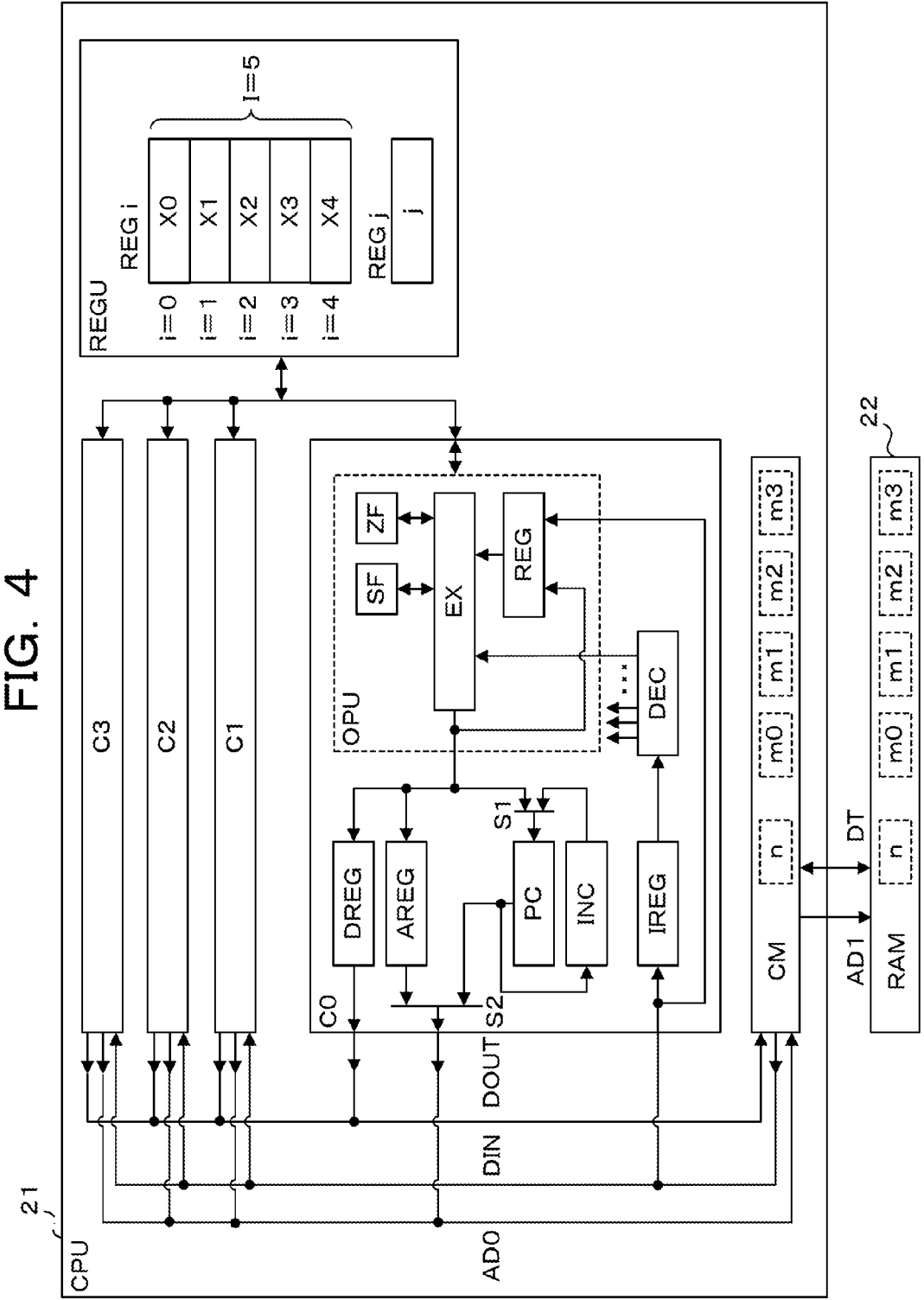
FIG. 4 illustrates an example of a configuration of a CPU in a parallel processing apparatus.

FIG. 4 illustrates an example of a configuration of a CPU in a parallel processing apparatus. The CPU 21 includes a plurality of cores C (C0, C1, C2, and C3), a cache memory CM, and a register part REGU. The configurations of the cores C may be substantially the same as or similar to one another. FIG. 4 illustrates the configuration of the core C0 as an example. The number of cores C is not limited to four and may be arbitrary. The CPU 21 is coupled to the RAM 22.

The core C0 includes a calculation part OPU, a data register part DREG, an address register part AREG, a program counter PC, an incrementer INC, an instruction register part IREG, a decoder part DEC, and selectors S1 and S2. The calculation part OPU includes a register file REG, a computing unit EX, and flag registers SF and ZF.

The program counter PC outputs an address received from the selector S1 to the incrementer INC and the selector S2. The incrementer INC increments an address received from the program counter PC and outputs the incremented address to the selector S1.

In the case where instruction code is sequentially fetched, the selector S1 selects an address from the incrementer INC, and in the case where a branching instruction, a jump instruction, or the like is executed, the selector S1 selects an address from the calculation part OPU. The selector S1 outputs the selected address to the program counter PC. In the case where instruction code is fetched, the selector S2 selects an address output by the program counter PC, and in the case where a load instruction or a store instruction is executed, the selector S2 selects an address output by the address register part AREG. The selector S2 outputs the selected address to the cache memory CM via an address bus AD0.

In the case where the core C0 fetches an instruction, instruction code is read from the cache memory CM in accordance with an address AD0, and the read instruction code is stored in the register part IREG via a data bus DIN. In the case where the cache memory CM does not store instruction code, the cache memory CM outputs an address to the RAM 12 via an address bus AD1 and receives instruction code from the RAM 12 via a data bus DT. For example, an address AD1 is an upper address of the address AD0, and instruction code (a program) of one cache line of the cache memory CM is read from the RAM 12. The cache memory CM stores instruction codes read from the RAM12 and outputs instruction code to be read among the stored instruction codes to the instruction register part IREG via the data bus DIN.

In the case where the core C0 executes a load instruction, data is read from the cache memory CM in accordance with the address AD0, and the read data is stored in the register file REG via the data bus DIN. In the case where the cache memory CM does not store target data for the load instruction, as in the case of reading instruction code, the cache memory CM reads data of one cache line from the RAM 22. The cache memory CM stores the data read from the RAM22 and outputs data to be loaded among the stored data to the register file REG via the data bus DIN.

In the case where the core C0 executes a store instruction, data that has been output to a data bus DOUT from the data register part DREG is written to the cache memory CM in accordance with the address that has been output to the address bus AD0.

The instruction register part IREG includes a plurality of areas in which instruction codes received from the cache memory CM are to be stored and sequentially outputs the stored instruction code to the decoder part DEC. The decoder part DEC decodes the instruction code received from the instruction register part IREG and generates, based on the decoding results, control signals that control the operations of the calculation part OPU, the selectors S1 and S2, and the like.

The data register part DREG includes a plurality of areas in which data that is output by the calculation part OPU when a store instruction is executed are to be stored. The address register part AREG includes a plurality of areas in which addresses that are output by the calculation part OPU when a load instruction or a store instruction is executed are to be stored.

The register file REG includes a plurality of registers that store data read from the cache memory CM or data output by the computing unit EX. The register file REG outputs, based on a control signal from the decoder part DEC, data stored in at least one of the plurality of registers of the register file REG to the computing unit EX.

The computing unit EX performs a computation in accordance with instruction code decoded by the decoder part DEC and outputs the computation results to the register file REG, the data register part DREG, the address register part AREG, or the selector S1. Based on the computation results, the computing unit EX sets or resets the flag registers SF and ZF and refers to the values of the flag registers SF and ZF when a logical instruction, a branching instruction, or the like is executed. The calculation part OPU may include a flag register other than the flag registers SF and ZF.

The register part REGU includes a plurality of registers REGi (i is one of 0, 1, 2, 3, and 4) and a register REGj. The number I of storage areas of the registers REGi is not limited to "5" as long as it is "1" or greater. The register part REGU stores reach information that indicate that the processing operations performed by the cores C0 to C3 have reached the starts of the processing blocks.

In FIG. 4, the value stored in each of the registers REGi is indicated by a reference numeral Xi (one of X0 to X4). For example, the bit width of each of the registers REGi and the bit width of the register REGj may be equal to each other.

The registers REGi are cyclically used in accordance with the progress of the parallel processing. Unreached numbers Xi, which are the numbers of threads TH that have not yet reached the starts of the processing blocks in which the subsets are processed, are stored in the registers REGi. The number obtained by subtracting one of the unreached numbers Xi from the number of cores C0 to C3, that is, 4, indicates the number of threads TH that have reached the start of one of the processing blocks. Each of the unreached numbers Xi may be an example of reached number information that indicates the number of cores C0 to C3 whose processing operations have reached the starts of the processing blocks. The number of threads TH that have reached the starts of the processing blocks may be stored in each of the registers REGi.

A total passage number j, which is the total number of single processing blocks SIB through which all the threads TH have passed, is stored in the register REGj. The total passage number j may be an example of total passage number information that indicates the number of single processing blocks SIB through which the processing operations performed by all the cores C0 to C3 have passed. The register REGj may be an example of a total passage number area that stores the total passage number information.

Similar to an add instruction, a multiply instruction, a load instruction, a store instruction, and the like, the instruction code TEST&IDA is processed as a result of one of the computing units EX running a microprogram. The operation of the computing unit EX that executes the instruction code TEST&IDA may be realized by employing the wired logic control system. For example, by employing the microprogram control system, the instruction code TEST&IDA may easily be added compared with the case of employing the wired logic control system, and the hardware function (instruction set architecture) may easily be changed.

The cache memory CM serves as an instruction cache and a data cache. The cache memory CM may be provided for each of the cores C and may include a primary cache and a secondary cache. The RAM 22 includes a storage area that stores a thread number n, which is the number of threads executed by the cores C, and a storage area that stores passage numbers m (m0, m1, m2, and m3), which indicate the numbers of cores C0 to C3 that have passed through the processing blocks. The thread number n and the passage numbers m are also stored in the cache memory CM. In the case where the cache memory CM stores the thread number n and the passage numbers m, the cores C may refer to the thread number n and the passage numbers m by accessing the cache memory CM without accessing the RAM 22 and may rewrite the passage numbers m.

Based on the unreached numbers Xi and the total passage number j stored in the register part REGU, an SA instruction serves as an NOP instruction or a jump instruction. The SA instruction has two arguments n and adr. The argument n is the number of threads. The argument adr is a jump address when the SA instruction serves as a jump instruction.

Figure 5:
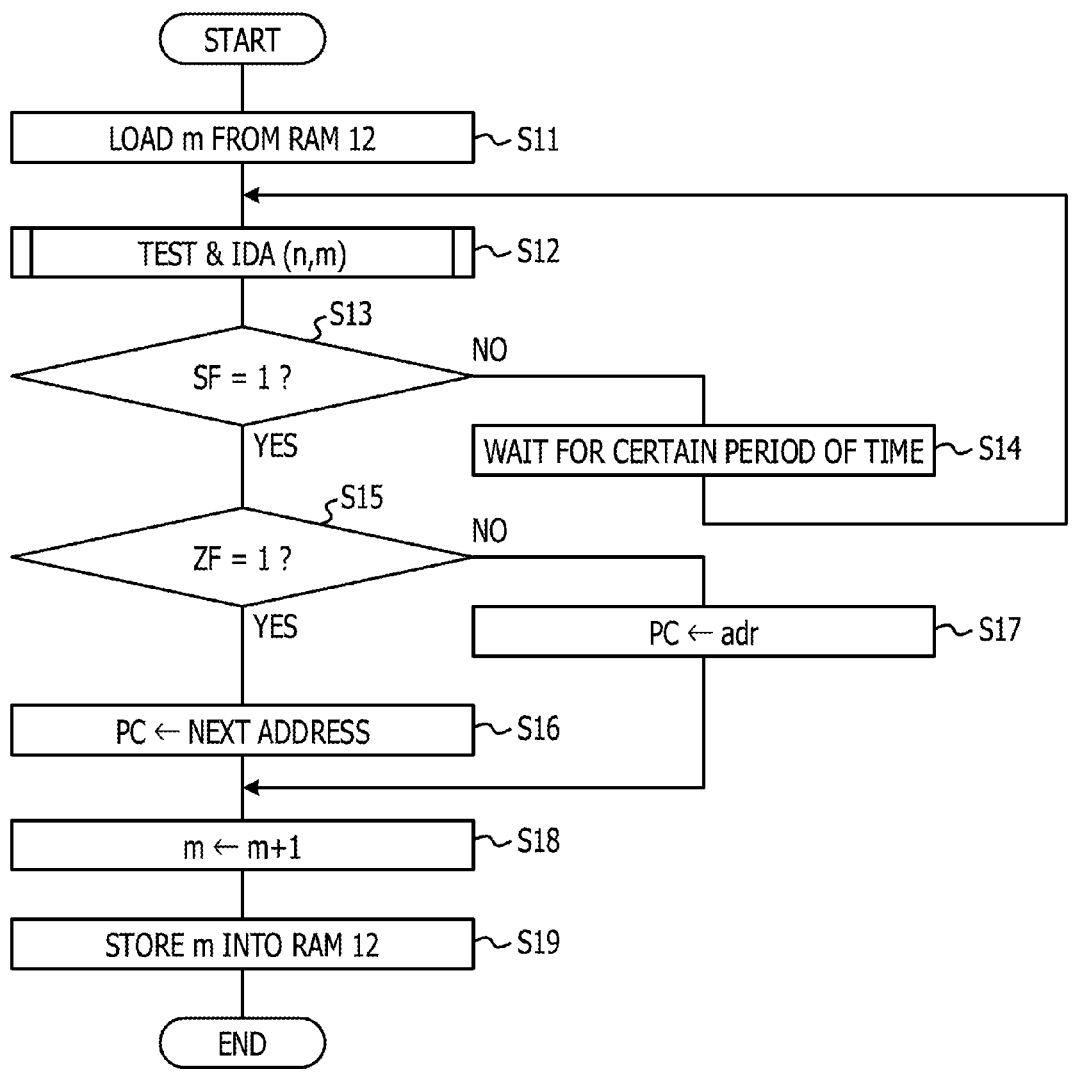
FIG. 5 illustrates an example of processing of an SA instruction.

FIG. 5 illustrates an example of processing of an SA instruction. One of the cores C loads the thread number n and one of the passage numbers m from the RAM 12 (Operation S11). In the case where the RAM 12 stores the thread number n and the passage number m, the thread number n and the passage number m are read from the cache memory CM.

The core C uses the thread number n and the passage number m, which have been loaded from the RAM 12, as variables and executes instruction code TEST&IDA (Operation S12). The core C determines whether the value of the flag register SF is 1 (Operation S13). In the case where the core C determines that the value of the flag register SF is 1 (Yes in Operation S13), the core C determines that there is an available register REGi and then determines whether the value of the flag register ZF is 1 (Operation S15). In the case where the core C determines that the value of the flag register SF is not 1 (NO in Operation S13), the core C determines that there is no available register REGi, and the process proceeds to Operation S14. After the core C has waited for a certain period of time, the process returns to Operation S12. Note that, in Operation S14, the core C may perform other processing while waiting for the certain period of time.

In the case where the core C determines that the value of the flag register ZF is 1 (Yes in Operation S15), the program counter PC is set to the next address of the SA instruction (Operation S16). In the case where the core C determines that the value of the flag register ZF is not 1 (NO in Operation S15), the program counter PC is set to adr (Operation S17).

The core C increments the passage number m, which has been loaded from the RAM 12, by 1 (Operation S18). The core C stores the passage number m into the RAM 12 (Operation S19). In the case where the cache memory CM stores the passage number m, the passage number m is stored in the RAM 12 after being stored in the cache memory CM. The core C ends the execution of the SA instruction.

Figure 6:
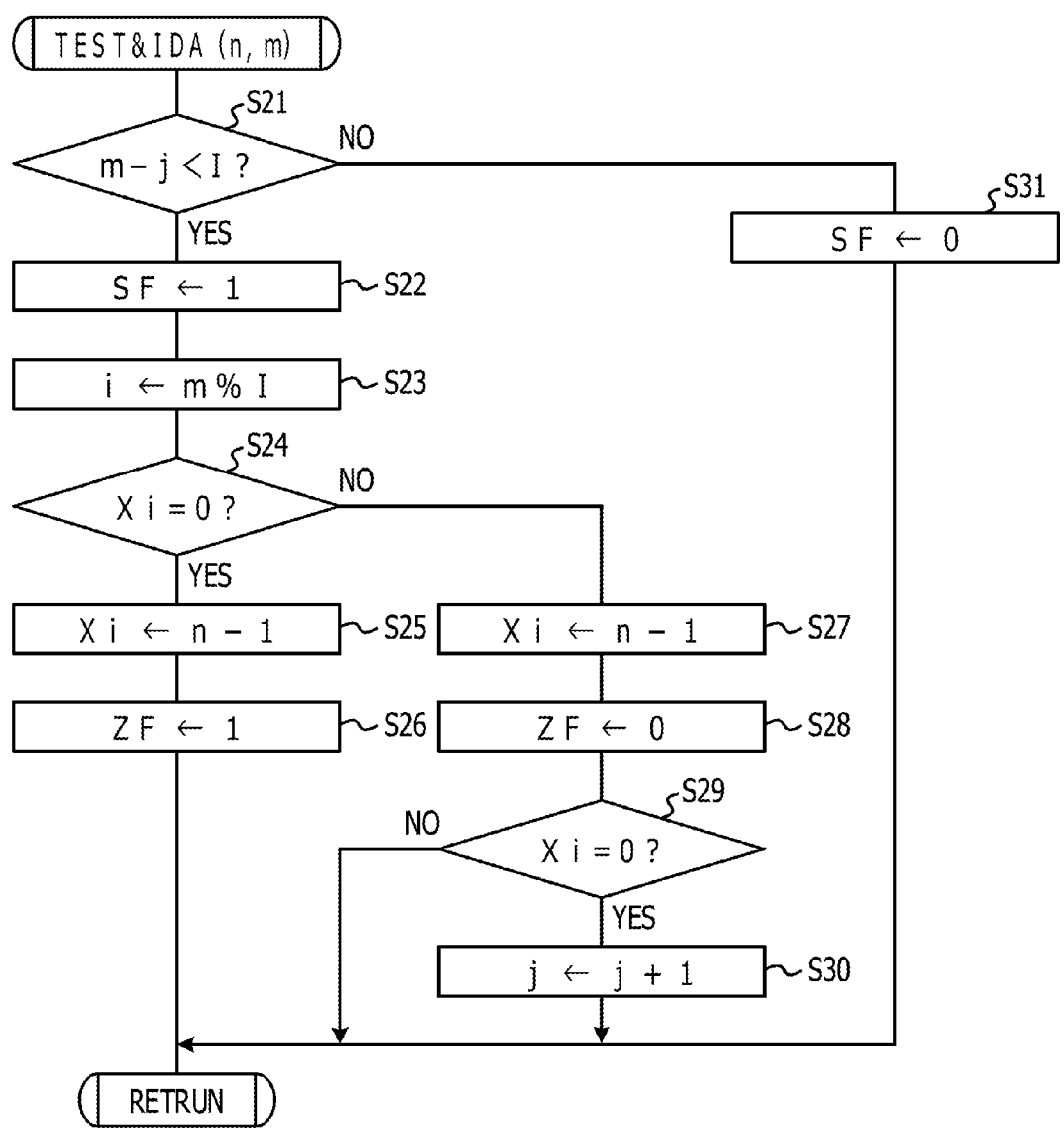
FIG. 6 illustrates an example of processing of instruction code TEST&IDA.

FIG. 6 illustrates an example of processing of instruction code TEST&IDA. The processing illustrated in FIG. 6 may be performed as a result of one of the computing units EX illustrated in FIG. 4 running a microprogram corresponding to the instruction code TEST&IDA.

The computing unit EX determines whether the difference between one of the passage numbers m and the total passage number j is less than the number I of storage areas of the registers REGi (Operation S21). When the computing unit EX determines that the difference between the passage number m and the total passage number j is less than the number I of storage areas of the registers REGi (YES in Operation S21), the computing unit EX sets the value of the flag register SF to 1 in order to indicate that the corresponding processing has reached the start of one of the processing blocks (Operation S22).

The computing unit EX calculates the remainder i obtained by dividing the passage number m by the number I of storage areas of the registers REGi and sets the calculated remainder i as the number i of the register REGi to be used (Operation S23).

The computing unit EX determines whether the unreached number Xi stored in the register REGi that has been determined in Operation S23 is 0, for example, whether the processing has reached first the start of the processing block (Operation S24). In the case where the computing unit EX determines that the processing has reached first the start of the processing block, for example, determines that Xi is 0 (Yes in Operation S24), the computing unit EX stores the value obtained by subtracting one from the thread number n as the unreached number Xi into the register REGi (Operation S25). The computing unit EX sets the value of the flag register ZF to 1 in order to indicate that the processing has reached first the start of the processing block (Operation S26) and ends the processing.

In the case where the computing unit EX determines that the unreached number Xi is not 0 (NO in Operation S24), the computing unit EX decrements the unreached number Xi by 1 (Operation S27) since the processing of one of the other cores C has already reached the start of the processing block. The computing unit EX resets the value of the flag register ZF to 0 in order to indicate that the processing has not reached first the start of the processing block (Operation S28). The computing unit EX determines whether the unreached number Xi is 0 (Operation S29). In the case where the unreached number Xi is 0 (YES in Operation S29), the computing unit EX increments the total passage number j by 1 (Operation S30) since the processing has reached last the start of the processing block and ends the processing.

In the case where the unreached number Xi is not 0 (NO in Operation S29), the computing unit EX ends the processing since there is a core C whose processing operation has not yet reached the start of the processing block.

In the case where the computing unit EX determines that the difference between the passage number m and the total passage number j is equal to or greater than the number I of storage areas of the registers REGi (NO in Operation S21), for example, in the case where there is no available register REGi, the computing unit EX sets the value of the flag register SF to 0 (Operation S31) and ends the processing. The computing unit EX sets the value of the flag register SF to 0 in order to spuriously indicate that the processing has not yet reached the start of the processing block even though the processing has actually reached the start of the processing block.

As described above, as a result of execution of an SA instruction, the thread which has reached first the start of each of the processing blocks performs a processing operation in one of the respective processing blocks, and the other threads that reach subsequently the start of the processing block jump to the start of the next processing block. Thus, each of the processing blocks is executed by the thread which reaches first the start of the respective processing blocks. The threads that reach subsequently the start of each of the processing blocks jump to the start of the next processing block. Without performing synchronous processing, the threads perform processing operations related to unprocessed subsets in a continuous manner.

Figure 7:
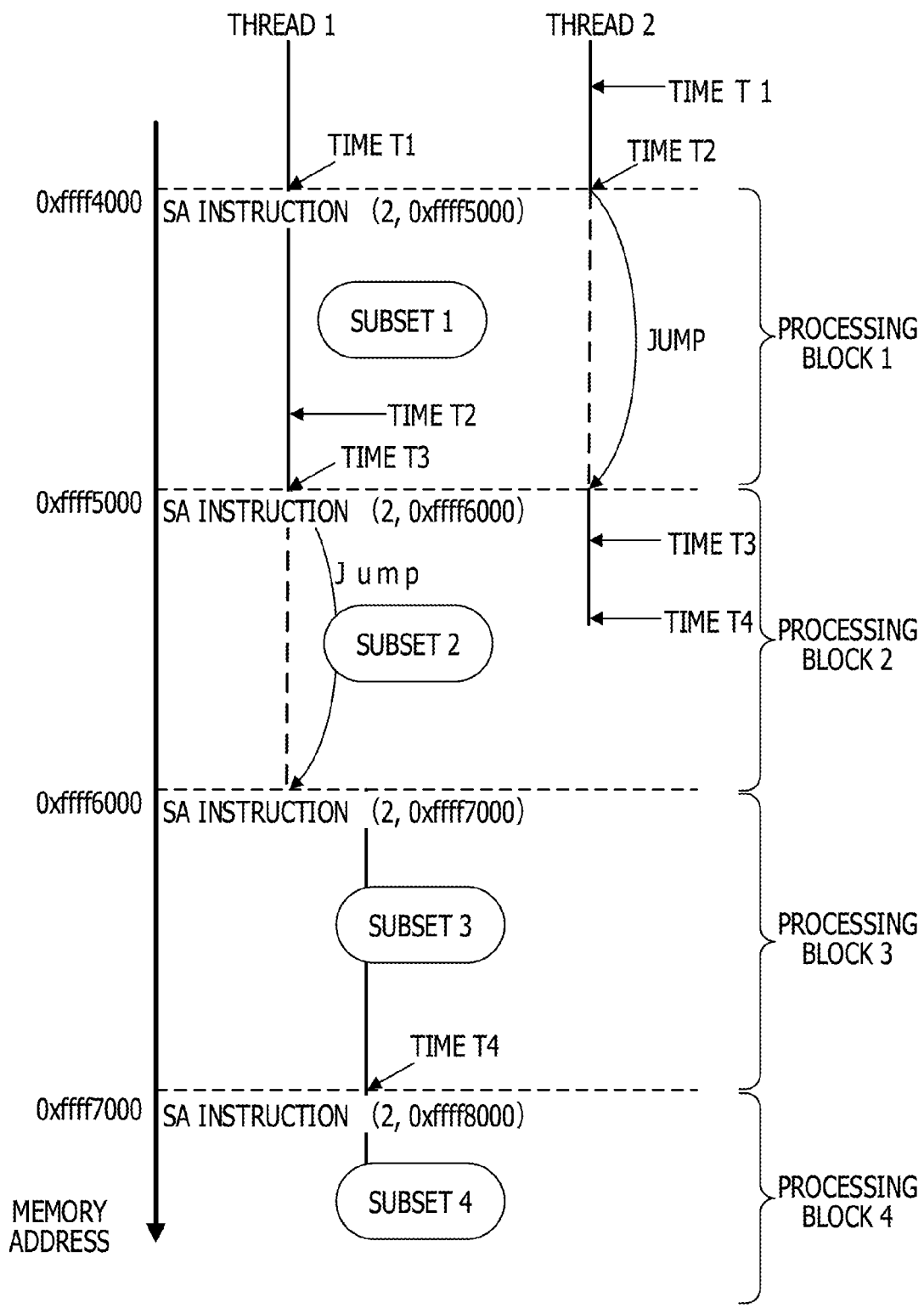
FIG. 7 illustrates an example of processing of an SA instruction.

FIG. 7 illustrates an example of processing of an SA instruction. In FIG. 7, the operations of two threads 1 and 2 are illustrated in order to make the following description simple. The processing operations performed by the threads 1 and 2 proceed in a top to bottom direction as viewed in FIG. 7. The thread 1 reaches the start of a processing block 1 at time T1 and executes an SA instruction. Since the thread 2 has not yet reached the start of any processing block at time T1, the thread 1 performs a processing operation similar to an NOP as the SA instruction, and the thread 1 performs the processing of the processing block 1.

The thread 2 reaches the start of the processing block 1 at time T2. Since the thread 2 has reached the start of the processing block 1 after the thread 1 has reached the start of the processing block 1, the SA instruction serves as a jump instruction, and the thread 2 jumps to the start of a processing block 2. Then, the thread 2 executes another SA instruction. Since the thread 1 is performing the processing of the processing block 1 at time T2, the thread 2 reaches first the start of the processing block 2. Thus, the thread 2 performs a processing operation similar to an NOP as the SA instruction, and the thread 2 performs the processing of the processing block 2.

Although the thread 1 reaches the start of the processing block 2 at time T3, the thread 2 has already reached the start of the processing block 2, and thus, the thread 1 jumps to the start of a processing block 3 as a result of executing an SA instruction. Then, the thread 1 executes another SA instruction. Since the thread 2 is performing the processing of the processing block 2 at time T3, the thread 1 reaches first the start of the processing block 3. Thus, the thread 1 performs a processing operation similar to an NOP as the SA instruction, and the thread 1 performs the processing of the processing block 3.

The thread 1 reaches the start of a processing block 4 at time T4. The thread 1 executes an SA instruction. Since the thread 2 is performing the processing of the processing block 2 at time T4, the thread 1 reaches first the start of the processing block 4. Thus, the thread 1 performs a processing operation similar to an NOP as the SA instruction, and the thread 1 performs the processing of the processing block 4.

For example, a compiler generates a parallel processing program by using an SA instruction. The CPU 11 of the compiler apparatus 1 operates as a compiler as a result of running a compiler program. For example, an object program (parallel processing program) that subjects a set of processing target data (set S) included in processing target code D described below to parallel processing using k threads may be generated.

Figure 8:
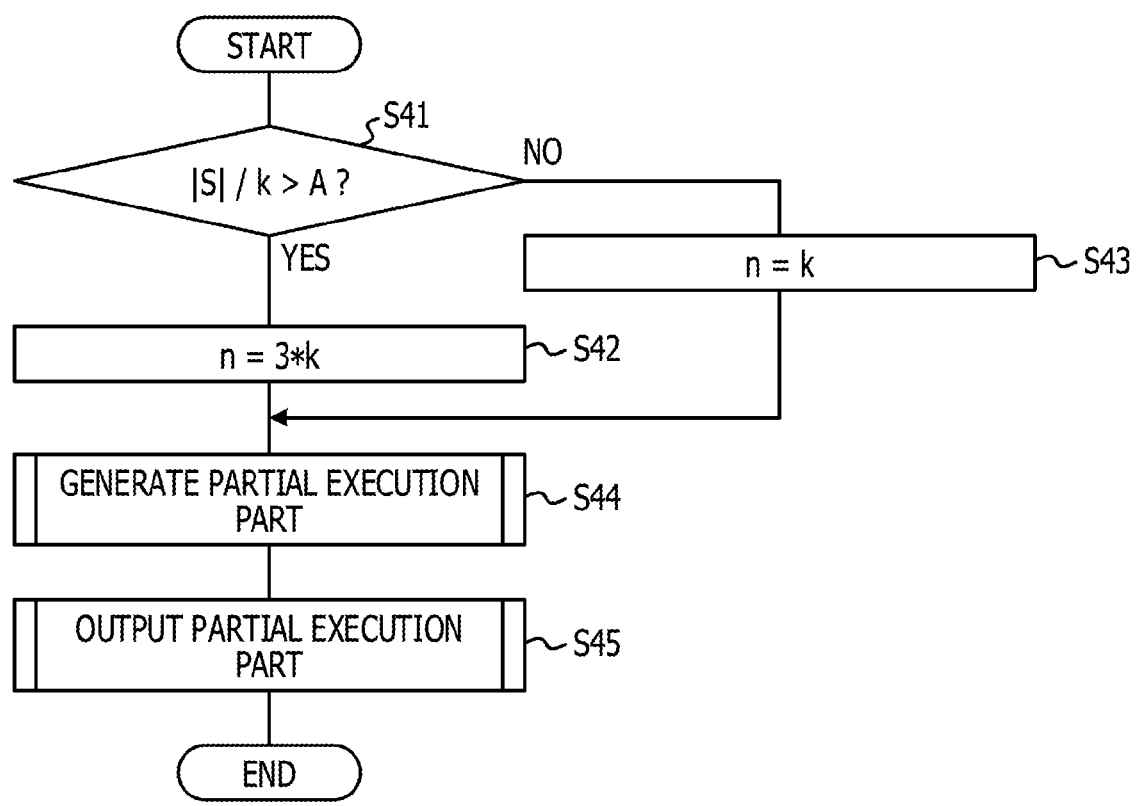
FIG. 8 illustrates an example of processing for generating a parallel processing program.

<Declarative Part of S> Thread_Parallel_Start
<Parallel Processing Execution Part for S> Thread_Parallel_End FIG. 8 illustrates an example of processing for generating a parallel processing program. In order to divide the set (a set of data) S into n (specified by an index ranging from 0 to n−1) subsets, the CPU 11 sets a divisor n that satisfies a condition of n≥k in the following manner. The CPU 11 determines whether the value obtained by dividing the number |S| of elements of the set S (hereinafter referred to as the element number |S|) by k is greater than a threshold A (Operation S41). The threshold A may be provided before the parallel processing program is generated, for example, during the compilation. In the case where the CPU 11 determines that the value obtained by dividing the element number |S| by k is greater than the threshold A (YES in Operation S41), the CPU 11 sets the divisor n to a value three times as large as k, which is the number of threads (Operation S42). In the case where the CPU 11 determines that the value obtained by dividing the element number |S| by k is less than or equal to the threshold A (NO in Operation S41), the CPU 11 sets the divisor n to k, which is the number of operations (Operation S43). The CPU 11 generates as many partial execution parts, for example, executable codes or processing blocks, as the divisor n (Operation S44). Each of the partial execution parts is obtained by associating the processing contents of a parallel processing execution part and one of the n subsets, which are obtained by dividing the set S, with each other. The CPU 11 outputs the generated partial execution parts (Operation S45). The CPU 11 ends the processing for generating a parallel processing program.

Figure 9:
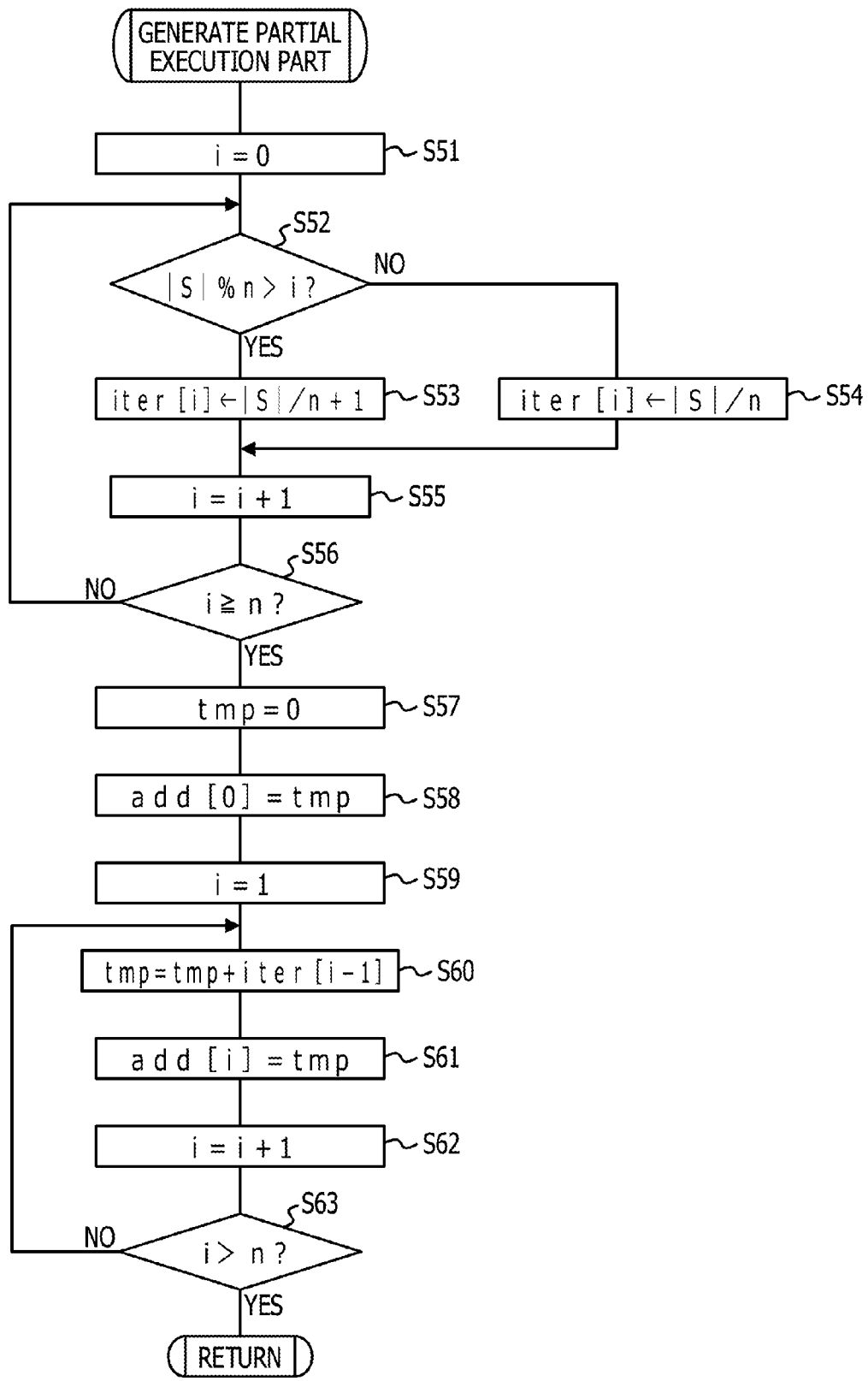
FIG. 9 illustrates an example of processing for generating a partial execution part.

FIG. 9 illustrates an example of processing for generating a partial execution part. The CPU 11 sets a loop variable i to 0 (Operation S51). The CPU 11 determines whether the remainder (|S|% n) obtained by dividing the element number |S| of the set S by n is greater than i (Operation S52). In the case where the CPU 11 determines that the remainder (|S| % n) obtained by dividing the element number |S| by n is greater than i (YES in Operation S52), the CPU 11 sets, as iter[i], the value obtained by adding 1 to the value obtained by dividing the element number |S| by n (Operation S53). In the case where the CPU 11 determines that the remainder (|S| % n) obtained by dividing the element number |S| by n is not greater than i (NO in Operation S52), the CPU 11 sets the iter[i] to the value obtained by dividing the element number |S| by n (Operation S54). The iter[i] indicates the number of iterations of the processing operation in the ith partial execution part.

The CPU 11 increments the loop variable i by 1 (Operation S55). The CPU 11 determines whether the loop variable i is equal to or greater than n (Operation S56). In the case where the CPU 11 determines that the loop variable i is less than n (NO in Operation S56), the CPU 11 causes the process to return to Operation S52. In the case where the CPU 11 determines that the loop variable i is equal to or greater than n (YES in Operation S56), the CPU 11 performs the process of Operation S57 and the subsequent processes. The process of Operation S57 and the subsequent processes are processes of setting a start element number add[i] of each part in which one of the subsets of the set S is to be processed.

The CPU 11 sets the value of a variable tmp to 0 (Operation S57). The CPU 11 sets the value of add[0] to tmp (Operation S58). The CPU 11 sets the loop variable i to 1 (Operation S59). The CPU 11 sets, as a new variable tmp, the value obtained by adding the value of iter[i−1] to the value of the variable tmp (Operation S60). The CPU 11 sets the value of add[i] to the value of the variable tmp (Operation S61). The CPU 11 increments the value of the loop variable i by 1 (Operation S62). The CPU 11 determines whether the loop variable i is greater than n (Operation S63). In the case where the CPU 11 determines that the loop variable i is less than n (NO in Operation S63), the CPU 11 causes the process to return to Operation S60. In the case where the CPU 11 determines that the loop variable i is greater than n (YES in Operation S63), the CPU 11 causes the process to return to the caller. Although the processes from Operation S52 to Operation S54 and the processes from Operation S60 to Operation S61 are illustrated as individual loops in FIG. 9, these processes may be performed as one loop processing operation.

Figure 10:
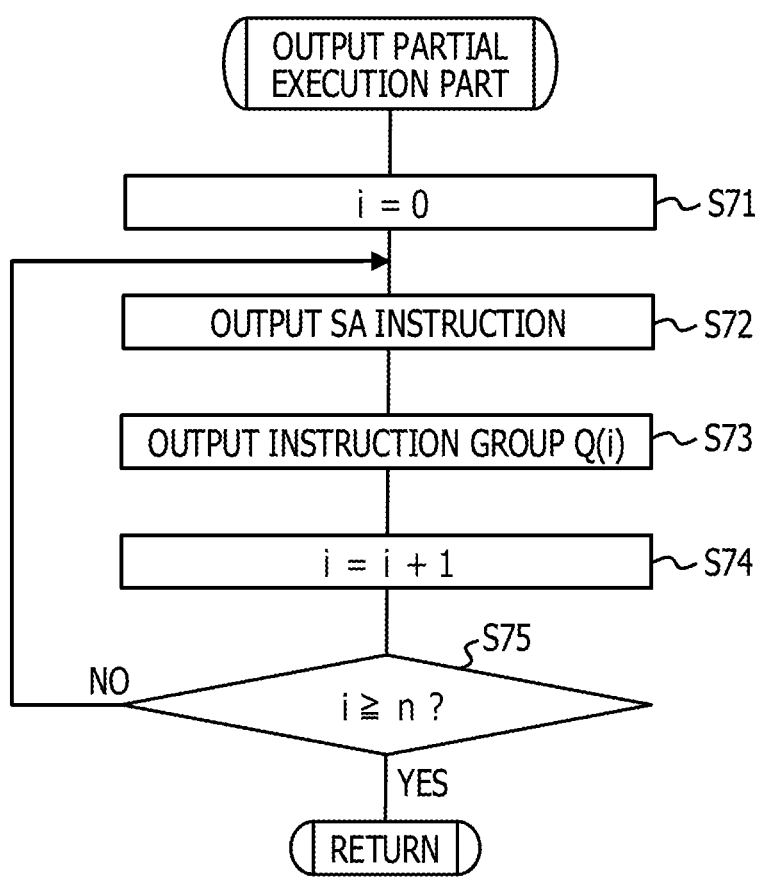
FIG. 10 illustrates an example of processing for outputting of a partial execution part.

FIG. 10 illustrates an example of processing for outputting of a partial execution part. The CPU 11 sets the loop variable i to 0 (Operation S71). The CPU 11 outputs an SA instruction (Operation S72). The first argument of the SA instruction is set to k, which is the number of threads. The second argument of the SA instruction is set to a memory address (exit address) subsequent to a memory address that stores the ith partial execution part. The CPU 11 outputs an instruction group Q(i) of the ith partial execution part (Operation S73). The CPU 11 increments the loop variable i by 1 (Operation S74). The CPU 11 determines whether the loop variable i is equal to or greater than n (Operation S75). In the case where the CPU 11 determines that the loop variable i is less than n (NO in Operation S75), the CPU 11 causes the process to return to Operation S72. In the case where the CPU 11 determines that the loop variable i is equal to or greater than n (YES in Operation S75), the CPU 11 causes the process to return to the caller. The processing for outputting a partial execution part may be integrated with the processing for generating a partial execution part, which is illustrated in FIG. 9, and performed as one loop processing operation.

Figure 11:
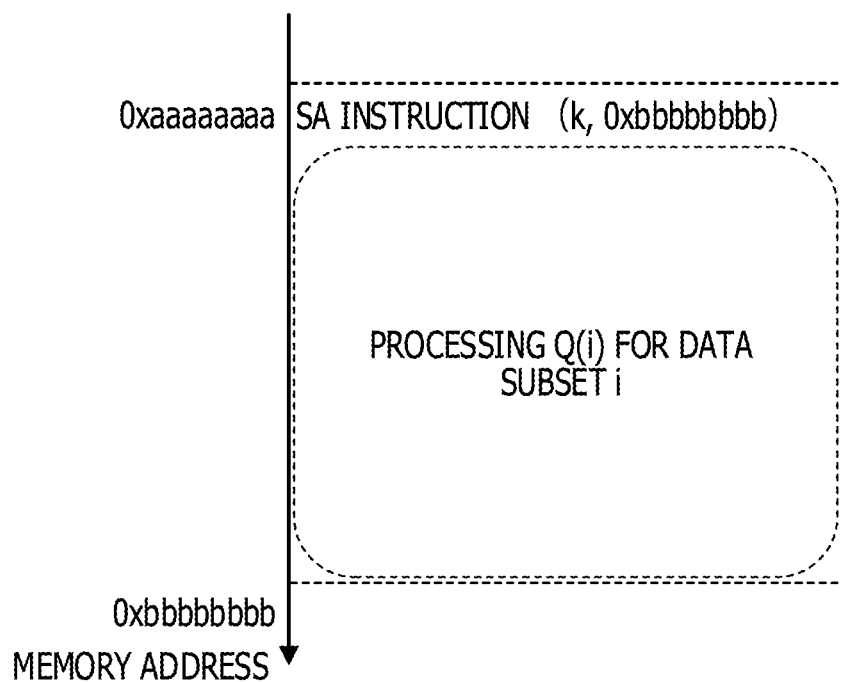
FIG. 11 illustrates an example of a configuration of a partial execution part.

FIG. 11 illustrates an example of a configuration of a partial execution part. FIG. 11 illustrates the ith partial execution part. As described above, an SA instruction is arranged at the start of the partial execution part. The first argument of the SA instruction is set to k, which is the number of threads. The second argument of the SA instruction is set to 0xbbbbbbbb, which is the start address of the next (i+1th) partial execution part.

Figure 12:
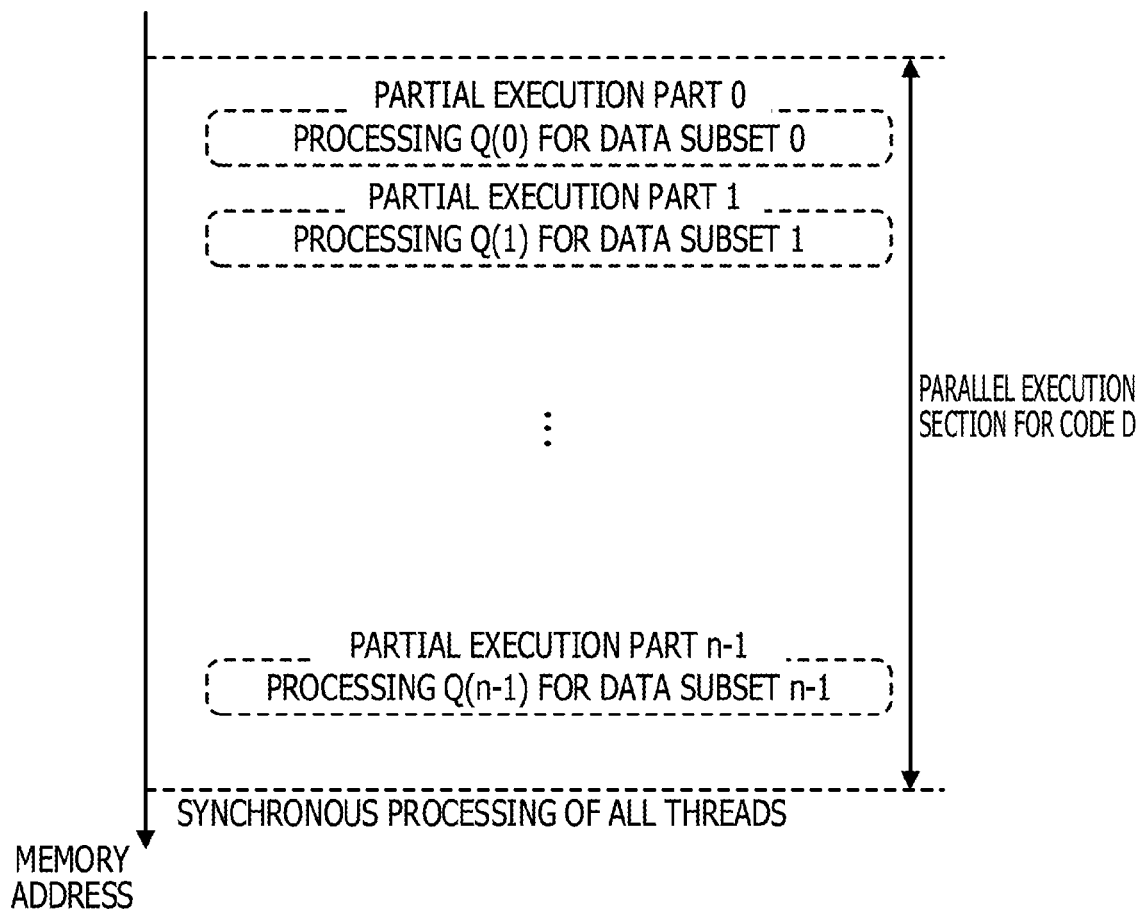
FIG. 12 illustrates an example of a configuration of a parallel processing program.

FIG. 12 illustrates an example of a configuration of a parallel processing program. The parallel processing program includes n partial execution parts including partial execution parts 0 to n−1. Each of the partial execution parts performs processing Q(i) (i=0 to n−1). The set S is divided into n subsets, and the partial execution part 0 performs the processing of a subset 0. Similarly, a partial execution part 1 performs the processing of a subset 1, and the partial execution part n−1 performs the processing of a subset n−1.

As illustrated in FIG. 11, an SA instruction is arranged at the start of each processing Q(i). When a thread that has reached first the ith partial execution part executes the SA instruction, a processing operation similar to an NOP instruction is executed, and the processing Q(i) of the ith partial execution part is performed. When a thread that has reached subsequently the ith partial execution part executes the SA instruction, a processing operation similar to a jump instruction is executed, and the thread jumps to the start of the (i+1)th partial execution part and executes another SA instruction. In the case where a thread that has reached first the (i+1)th partial execution part executes the SA instruction, a processing operation similar to an NOP instruction is executed as the SA instruction, and in the case where a thread that has reached subsequently the (i+1)th partial execution part executes the SA instruction, a processing operation similar to a jump instruction is executed as the SA instruction. Thus, in a similar manner to the above, the processing Q (i+1) of the (i+1)th partial execution part is performed by a thread that reaches first the (i+1)th partial execution part.

For example, in the compiler apparatus 1, a source program written in the C language may be generated.

int num=100000000; double a[N]; thread_para_startfor (i=0; i<num; i++)a[i]=a[i]*2; thread_para_end A start position and an end position of the thread parallel processing are respectively indicated by thread_para_start and thread_para_end.

For example, a parallel processing program that subjects a program to parallel processing using three threads is generated. Since the above-mentioned source program performs processing on an array having num elements (num=100,000,000), the element number |S| of the set S is num. For example, the threshold A that is used when determining the divisor n may be 20,000,000. Since a relationship of num/3>A is satisfied (YES in Operation S41 in FIG. 8), n=3*k=3*3 is derived, and thus, n=9 (Operation S42 in FIG. 8).

The remainder obtained by dividing the element number |S| of the set S by n is 1. In Operation S52 in FIG. 9, the determination is YES when i=0, and the determination is NO when i=1 to 8. The numbers of iterations are derived from Operation S53 and Operation S54 in FIG. 9 as follows:
iter[0]=11111112
iter[i]=11111111 (i=1 to 8)

The start element numbers add[i] of the subsets, each of which performs the processing of the corresponding partial execution part, are derived from the processes of Operation S57 to Operation S63 in FIG. 9 as follows:
add[0]=0
add[i]=11111112+11111111*(i−1) (i=1 to 8)

Figure 13A:
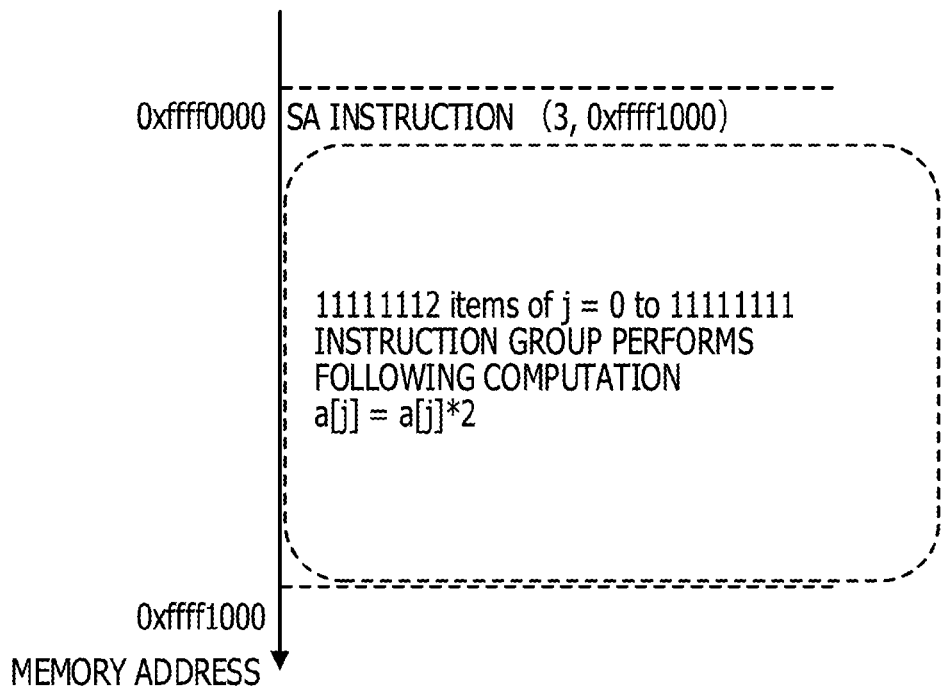
FIG. 13A and FIG. 13B each illustrate an example of contents of a partial execution part.
Figure 13B:
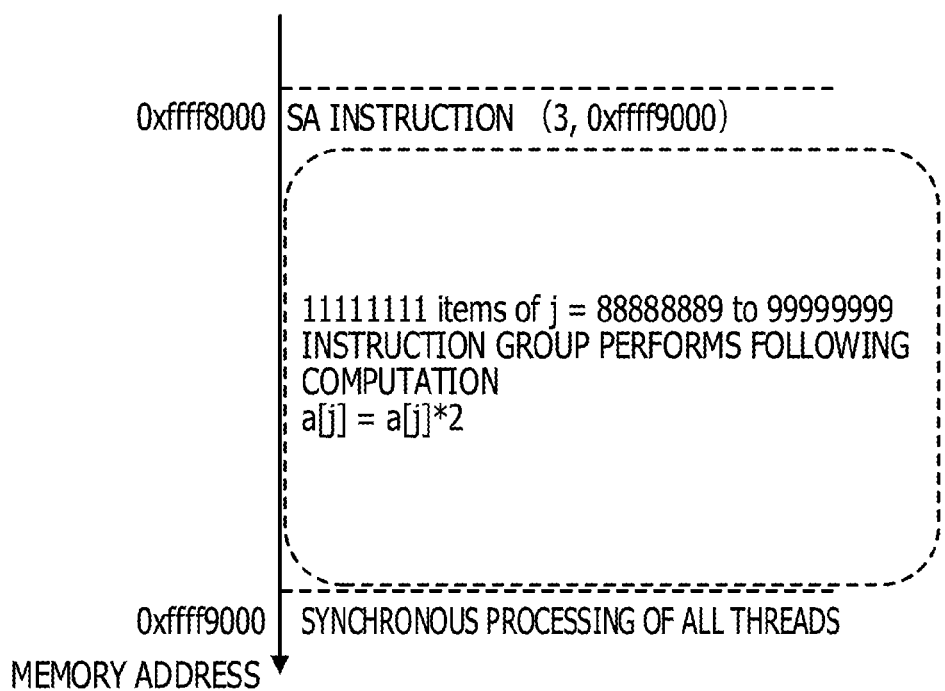

The compiler apparatus 1 generates the partial execution part 0 to a partial execution part 8. FIG. 13A and FIG. 13B each illustrate an example of contents of a partial execution part. FIG. 13A illustrates the zeroth partial execution part, and FIG. 13B illustrates the eighth partial execution part. Synchronous processing for all the threads is to be performed after the eighth partial execution part, and an operation in a parallel execution section is completed.

In a parallel processing program that is generated by the compiler apparatus 1 and run by the parallel processing apparatus 2, data to be processed is divided into subsets, the number of subsets being greater than the number of threads, and partial execution parts that perform processing operations for the respective subsets of the data are generated. An SA instruction is arranged at the start of each of the partial execution parts. The processing of each of the partial execution parts is performed by the thread that reaches first the partial execution part, and the other threads that reach subsequently the partial execution part jump to the next partial execution part. The SA instruction is also arranged at the start of the partial execution part to which the other threads jump, and an operation similar to the above is performed. Thus, without performing synchronous processing for the threads, the threads perform processing operations related to unprocessed subsets, and thus, the overall processing time may be reduced.

For example, a parallel processing program that includes a reduction clause may be generated. The reduction clause is a clause that is used when a part in which a reduction operation is performed is subjected to parallel processing. The reduction operation is an operation for data items included in a plurality of processes. The reduction operation may include, for example, an operation for calculating the sum total of data and an operation for calculating a maximum value and a minimum value.

In the reduction operation, the results of a plurality of threads are ultimately written in a shared memory area. Each of the threads may be written in the shared memory area by using a lock function of a processor. In the case where the number of threads is large, a writing conflict occurs, and a latency time occurs due to a lock operation. For example, a parallel processing program that has a configuration that may further reduce such a latency time may be generated.

Figure 14:
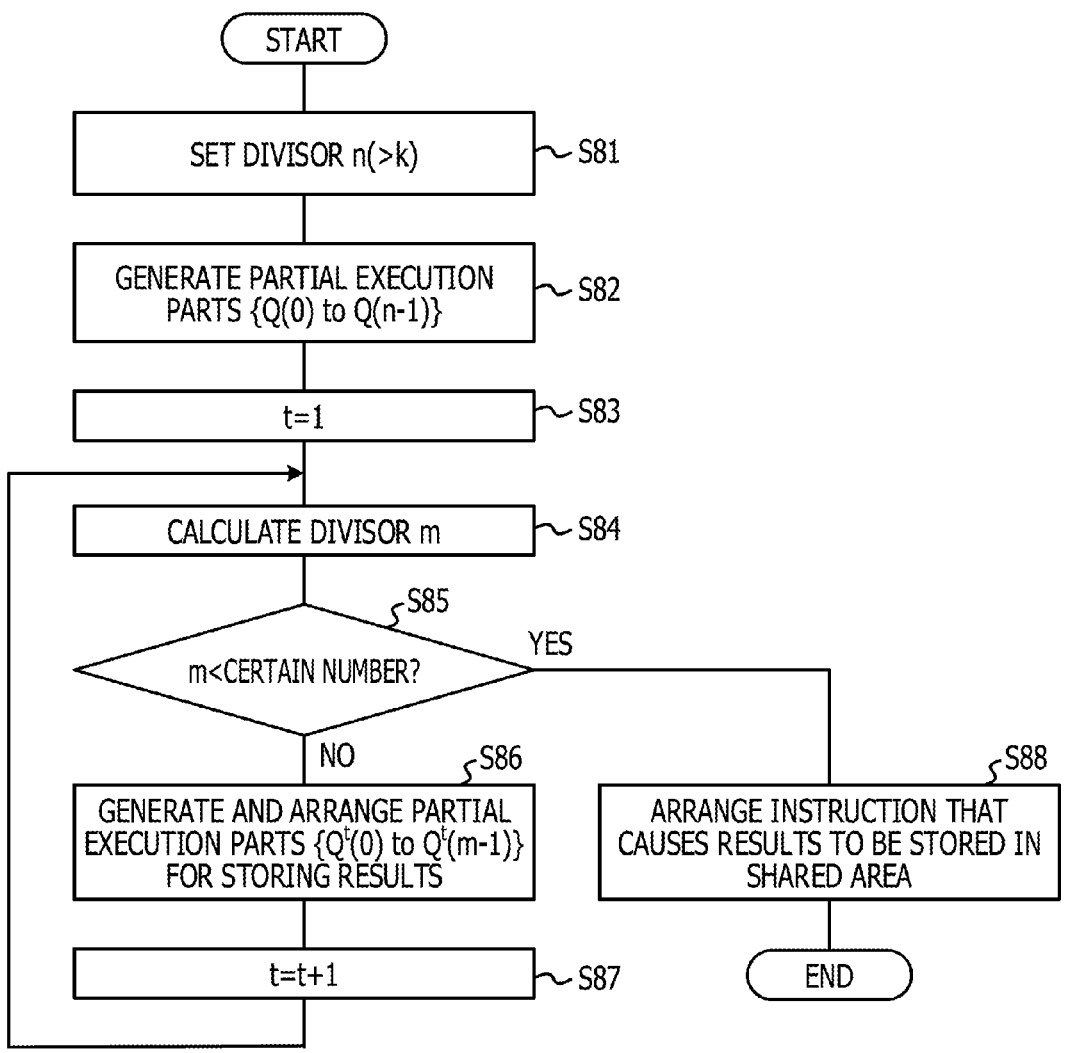
FIG. 14 illustrates an example of processing for generating a parallel processing program.

FIG. 14 illustrates an example of processing for generating a parallel processing program. The CPU 11 of the compiler apparatus 1 sets a divisor n, which is a number into which a parallel processing part that includes a reduction clause written in a source program is to be divided (Operation S81). The value of n is set to be greater than the value of k, which is the number of threads. The CPU 11 divides the parallel processing part into n pieces and generates partial execution parts $\{Q(0)$ to $Q(n-1)\}$ that are similar to those illustrated in FIG. 12 (Operation S82).

The CPU 11 sets a variable t to 1 (Operation S83). The variable t is a variable that indicates the number of times a partial execution part in which computation results are to be stored is generated. The CPU 11 calculates a divisor m (Operation S84). A natural number that satisfies a condition of n>m is set as m. By using the number of partial execution parts, which have been generated earlier, and the like, m is suitably set.

The CPU 11 determines whether the divisor m is less than a certain number (Operation S85). In the case where the CPU 11 determines that the divisor m is not less than the certain number (NO in Operation S85), the CPU 11 generates partial execution parts (store codes) $\{Q^t(0)$ to $Q^t(m-1)\}$ in which the results of $\{Q(0)$ to $Q(n-1)\}$ are to be stored and arranges the partial execution parts $\{Q^t(0)$ to $Q^t(m-1)\}$ after the partial execution parts $\{Q(0)$ to $Q(n-1)\}$ (Operation S86). The CPU 11 increments t by 1 (Operation S87). The CPU 11 causes the process to return to Operation S84.

In the case where the CPU 11 determines that the divisor m is less than the certain number (YES in Operation S85), the CPU 11 arranges an instruction that causes the computation results of the partial execution parts $\{Q^t(0)$ to $Q^t(m-1)\}$ to be stored in the shared memory area in accordance with the reduction clause by using, for example, an atomic operation instruction (Operation S88). The CPU 11 ends the processing.

Figure 15:
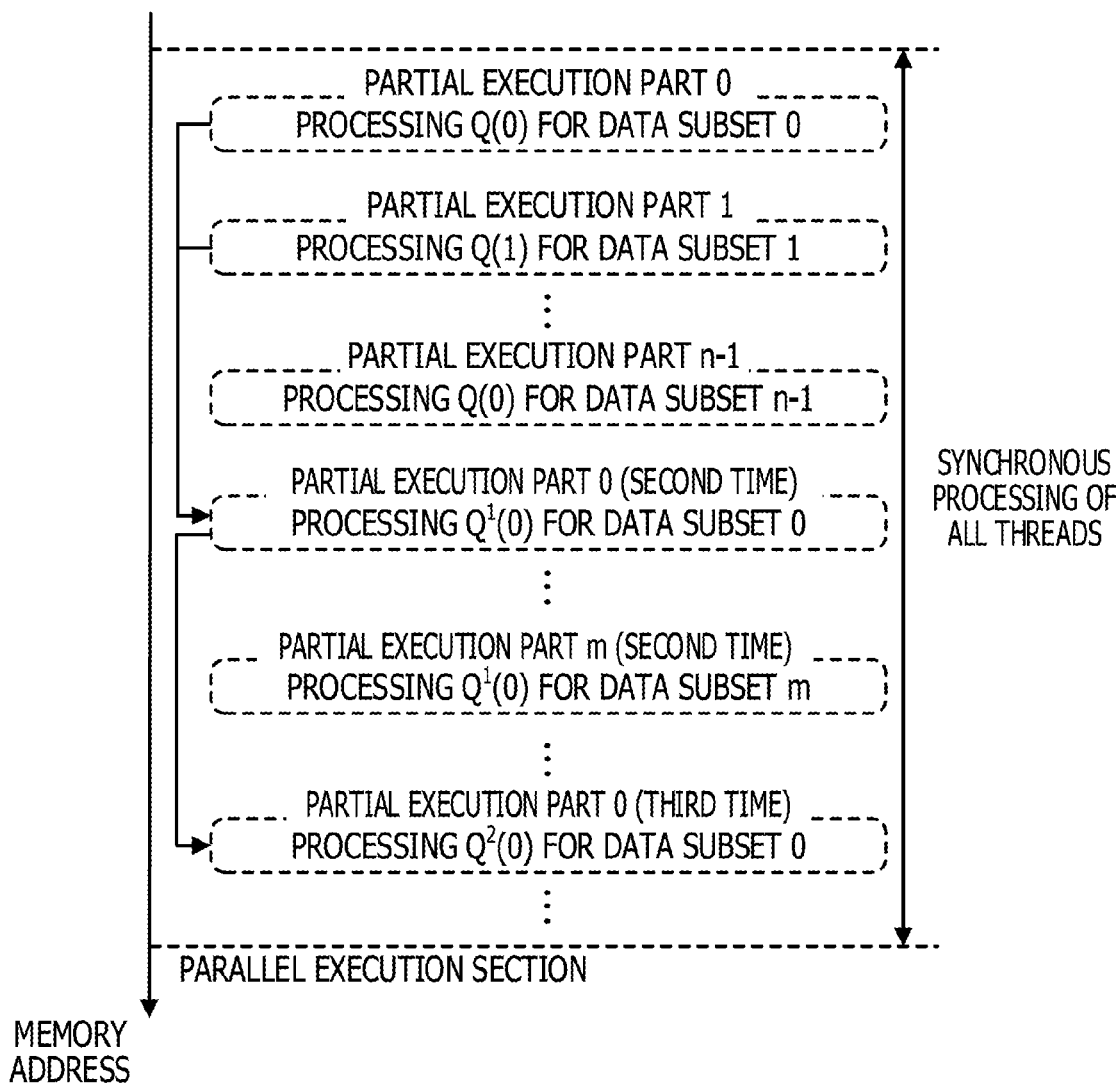
FIG. 15 illustrates an example of a configuration of a parallel processing program.

FIG. 15 illustrates an example of a configuration of a parallel processing program. The n partial execution parts, which include the partial execution part 0 that perform the processing Q(0) to the partial execution part n−1 that performs the processing Q(n−1), are arranged. Subsequently, the partial execution part 0 (second time) that performs processing $Q^1(0)$ for storing the results to a partial execution part m (second time) that performs processing $Q^1(m-1)$ are arranged. Subsequently, the partial execution part 0 (third time) that performs processing $Q^2(0)$, which includes an instruction that causes the computation results to be stored in the shared memory area, and the like are arranged. The synchronous processing for all the threads is arranged at the end of the parallel execution section.

The arrow extending from Q(0) and Q(1) toward $Q^1(0)$ in FIG. 15 indicates that the computation results of Q(0) and Q(1) given to the reduction clause are stored in an area accessible by $Q^1(0)$. The arrow extending from $Q^1(0)$ toward $Q^2(0)$ indicates an operation similar to the above.

In the processing of the parallel processing program illustrated in FIG. 15, the CPU 21 of the parallel processing apparatus 2 performs parallel processing by using k threads. The processing operations performed in the partial execution parts $\{Q(0)$ to $Q(n-1)\}$ may be similar to the processing operations illustrated in FIG. 1 to FIG. 13. Each of the threads realized by the CPU 21 causes the computation results in accordance with the contents of the reduction clause to be stored in an area accessible by a corresponding one of the next partial execution parts $\{Q^1(0)$ to $Q^1(m-1)\}$. For example, one of the threads that has reached the processing subsequent to Q(n−1) performs the processing $Q^1(0)$ arranged at the start of one of the next partial execution parts $\{Q^1(0)$ to $Q^1(m-1)\}$. Similarly, each of the threads consecutively performs processing operations for the partial execution parts in which processing operations have not yet performed.

Figure 16:
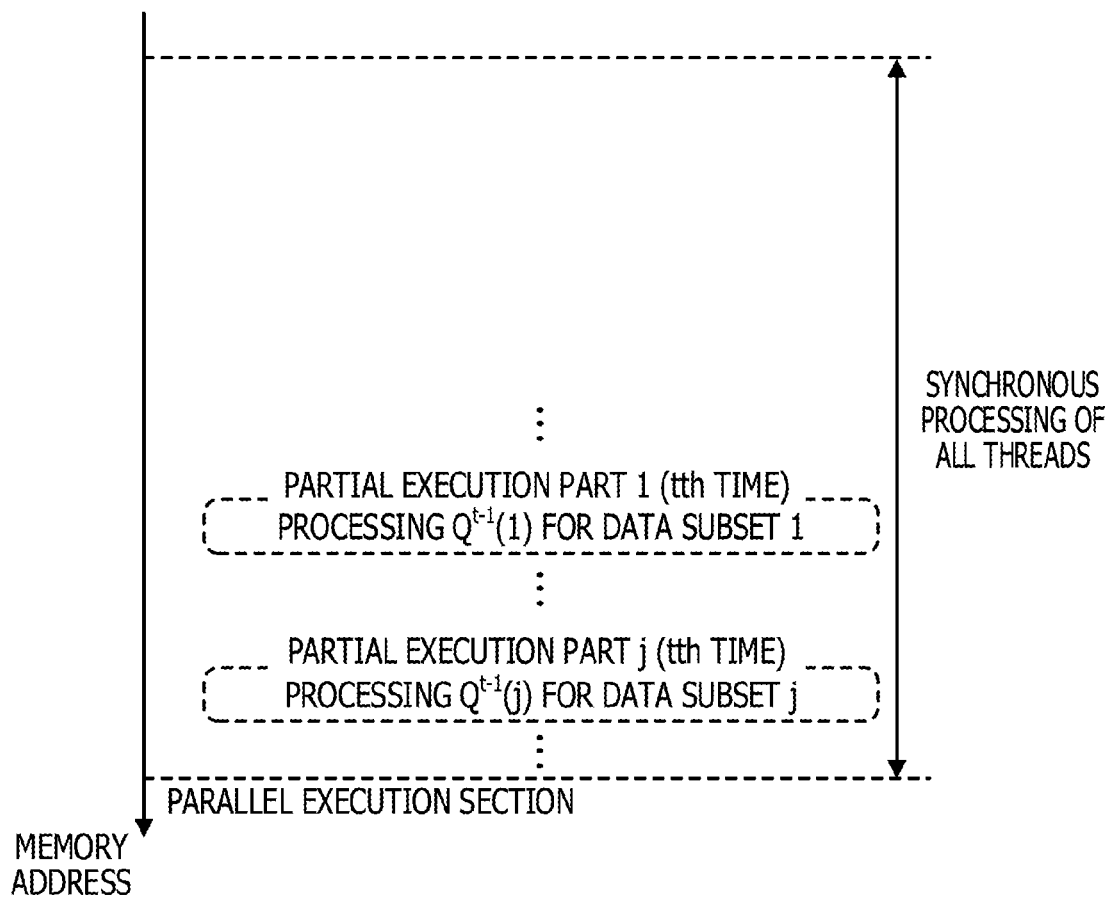
FIG. 16 illustrates an example of a configuration of a parallel processing program.

FIG. 16 illustrates an example of a configuration of a parallel processing program. FIG. 16 illustrates the arrangement of partial execution parts which are performed in the latter part of a parallel execution section of the parallel processing program. In FIG. 16, partial execution parts $\{Q^{r-1}(1)$ to $Q^{r-1}(j)\}$ are arranged. In each of the partial execution parts $\{Q^{r-1}(1)$ to $Q^{r-1}(j)\}$, a thread executes an instruction that causes the computation results to be stored in a shared memory area in accordance with a reduction clause. A thread that has reached the exit address of the last partial execution part waits until each of the other threads completes the processing operation of the parallel execution section. When the thread that is the last thread to complete the processing operation has reached the exit address of the last partial execution part, the thread is synchronized with the other threads, and the processing of the parallel execution section is completed.

Since a partial execution part in which an SA instruction is arranged is generated and executed unless the number of partial execution parts in each of which processing for storing the computation results is performed is equal to or less than a certain number, a latency time occurred due to memory lock may be reduced.

Figure 17:
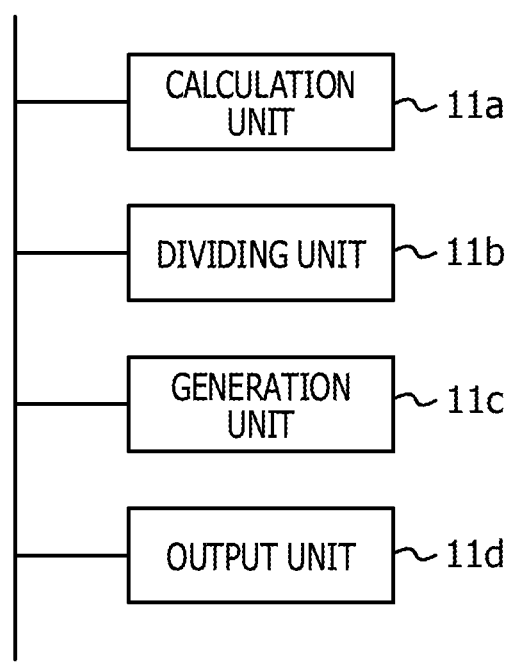
FIG. 17 illustrates an example of a functional configuration of a compiler apparatus.

FIG. 17 illustrates an example of a functional configuration of a compiler apparatus. The compiler apparatus 1 includes a calculation unit 11a, a dividing unit 11b, a generation unit 11c, and an output unit 11d. The compiler apparatus 1 may operate in the following manner as a result of the CPU 11 running the control program 1P.

The calculation unit 11a calculates, from the number of elements of a set of data to be processed, a divisor, which is a number into which the set of data is to be divided and which is greater than the number of threads. The dividing unit 11b divides the set of data by the calculated divisor. The generation unit 11c generates object code that includes a plurality of execution parts, which perform processing of the divided set of data, and instructions, each of which is arranged at the start of one of the execution parts and each of which is to be executed by the thread that reaches first the corresponding execution part. The output unit 11d outputs the generated object code.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A compiler method comprising:
calculating, by a computer, based on a number of elements of a set of data and a number of threads, a divisor for dividing the set of data, the divisor being greater than the number of threads;
generating a plurality of data subsets by dividing the set of data by the divisor; and
generating, for each of the plurality of data subsets, object code that includes executable code that performs processing of the respective data subsets and an instruction that is arranged at a start of the executable code and is to be executed by a first thread that reaches first the executable code,
the instruction, in each of the plurality of data subsets, serves as a no operation (NOP) instruction when a flag indicating that the first thread reaches the start of the executable code of the respective data subsets is set and serves as a jump instruction when the flag is not set,
whether the first thread reaches the start of the executable code of the respective data subsets is determined based on a passage number indicating a number of data subsets through which the first thread is passed and a total passage number indicating a number of data subsets through which all of the threads are passed, the first thread is determined to reach the start of the first executable code of the respective data subsets when a difference between the passage number and the total passage number is less than a specific value.

2. The compiler method according to claim 1, wherein the first thread executes the NOP instruction as the instruction, and wherein a second thread that does not reach first the executable code executes the jump instruction as the instruction.

3. The compiler method according to claim 1, further comprising:
generating, as the object code, a plurality of first storage codes for storing processing results of the plurality of data subsets; and
arranging, at a start of each of the plurality of first storage code, a first instruction that is to be executed by one of the threads that reaches first the respective first storage codes.

4. The compiler method according to claim 1, further comprising:
generating, as the object code, a plurality of n+1th storage code for storing processing results of a plurality of nth storage code, n being a natural number of one or more;
arranging a second instruction that is to be arranged at a start of each of the plurality of n+1th storage code and that is to be executed by one of the threads that reaches first the respective n+1th storage codes; and
recursively outputting the object code unless the number of the nth storage codes is less than a specific number.

5. The compiler method according to claim 1, wherein the flag is set using a memory storing reached number information indicating a number of threads which reach the start of the executable code of each of the data subsets.

6. A parallel processing method comprising:
acquiring, by a computer, a plurality of threads;
executing, by a first thread, included in the plurality of threads, that reaches first executable code related to processing of a first data subset included in a plurality of data subsets obtained by dividing a set of data, the first executable code after executing a first instruction arranged at a start of the first executable code; and
executing, by a second thread included in the plurality of threads, that reaches the first executable code later than the first thread, second executable code related to processing of a second data subset included in the plurality of data subsets after executing a second instruction arranged at a start of the second executable code,
the first instruction serves as a no operation (NOP) instruction when a flag indicating that the first thread reaches the start of the executable code of the first data subset is set and serves as a jump instruction when the flag is not set,
whether the first thread reaches the start of the first executable code of the respective data subsets is determined based on a passage number indicating a number of data subsets through which the first thread is passed and a total passage number indicating a number of data subsets through which all of the threads are passed, the first thread is determined to reach the start of the first executable code of the respective data subsets when a difference between the passage number and the total passage number is less than a specific value.

7. The parallel processing method according to claim 6, wherein the flag is set using a memory storing reached number information indicating a number of threads which reach the start of the executable code of each of the data subsets.

8. The parallel processing method according to claim 6, wherein a divisor is calculated, based on a number of elements of the set of data and a number of the plurality of threads, so as to be a value greater than the number of the threads.

9. A compiler apparatus comprising:
memory configured to store a program; and
processor configured to execute the program, the processor, based on the program, performs operations of:
calculating, based on a number of elements of a set of data to be processed and a number of threads, a divisor for dividing the set of data, the divisor being greater than the number of threads;
generating a plurality of data subsets by dividing the set of data by the divisor; and
generating, for each of the plurality of data subsets, object code that includes executable code that performs processing of the respective data subsets and an instruction, arranged at a start of the executable code, to be executed by a first thread that reaches first the executable code, the instruction, in each of the plurality of data subsets, serves as a no operation (NOP) instruction when a flag indicating that the first thread reaches the start of the executable code of the respective data subsets is set and serves as a jump instruction when the flag is not set,
whether the first thread reaches the start of the executable code of the respective data subsets is determined based on a passage number indicating a number of data subsets through which the first thread is passed and a total passage number indicating a number of data subsets through which all of the threads are passed, the first thread is determined to reach the start of the first executable code of the respective data subsets when a difference between the passage number and the total passage number is less than a specific value.

10. The compiler apparatus according to claim 9, wherein the first thread executes the NOP instruction as the instruction, and wherein a second thread that does not reach first the executable code executes the jump instruction as the instruction.

11. The compiler apparatus according to claim 9, wherein the flag is set using a memory storing reached number information indicating a number of threads which reach the start of the executable code of each of the data subsets.

* * * * *